May 21, 1929.  R. W. JOHNSON  1,713,832
OVEN HEAT REGULATOR
Filed Oct. 8, 1924
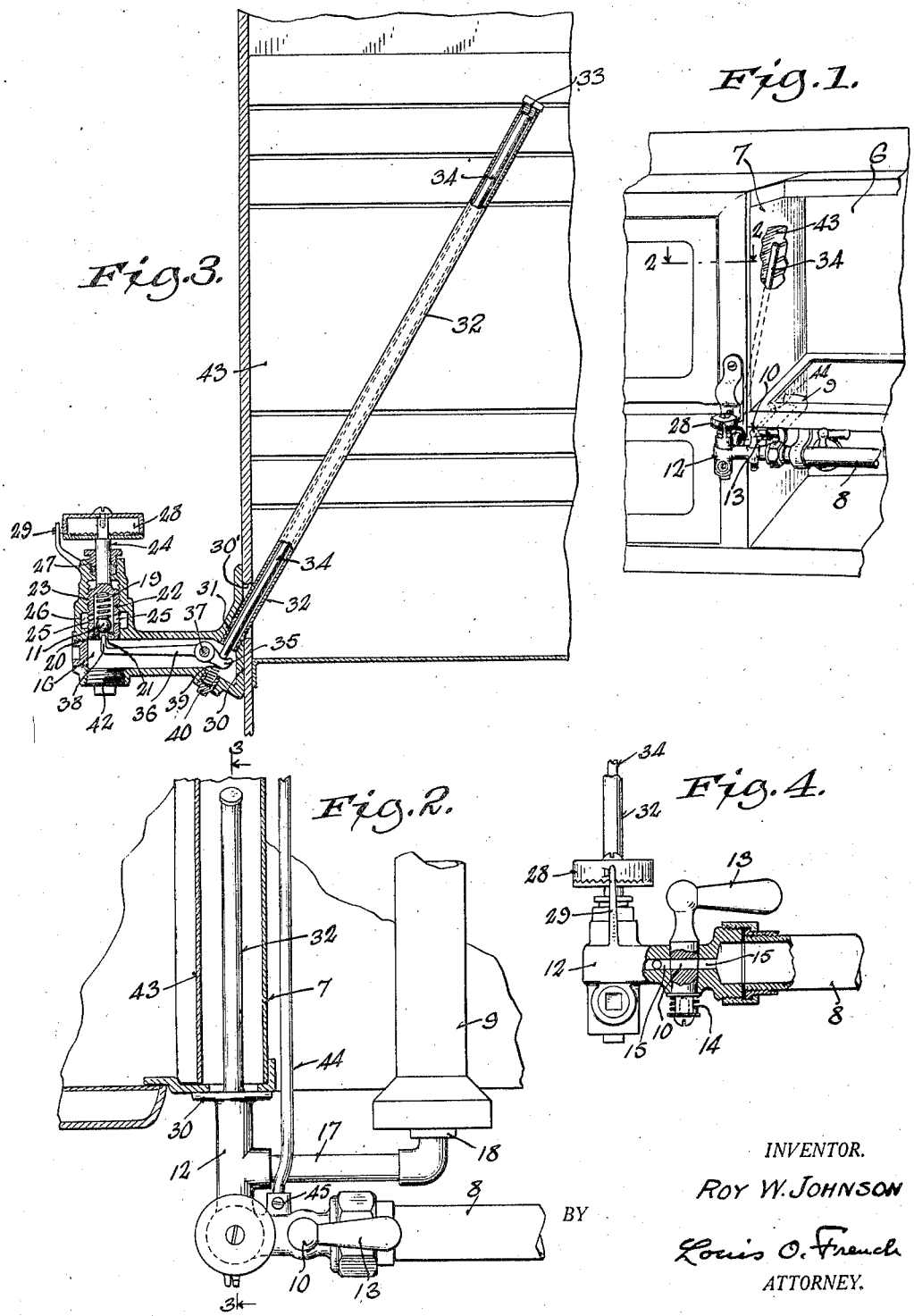
INVENTOR.
Roy W. Johnson
Louis O. French
ATTORNEY.

Patented May 21, 1929.

1,713,832

UNITED STATES PATENT OFFICE.

ROY W. JOHNSON, OF MILWAUKEE, WISCONSIN, ASSIGNOR, BY MESNE ASSIGNMENTS, TO MILWAUKEE GAS SPECIALTY COMPANY, OF MILWAUKEE, WISCONSIN, A CORPORATION OF WISCONSIN.

OVEN-HEAT REGULATOR.

Application filed October 8, 1924. Serial No. 742,377.

The invention relates to oven temperature regulating devices, and to that general type of regulating device in which a thermostatic element within the oven controls the supply of gas to the oven burner.

One of the objects of the invention is to provide a gas oven regulator in which the adjustment for maintaining the heat within the oven at a predetermined temperature is effected by varying the position of the valve structure relative to the thermostatically-operated member so that said member will open the valve to a greater or less extent, depending upon the initial position of the valve structure relative to said member.

A further object of the invention is to greatly simplify devices of this general type by a novel arrangement of the thermostatic element in the oven and its relation to the manifold supplying the oven and other burners of the stove whereby it is an easy matter to install the device, and whereby the usual outside connections are eliminated.

The invention further consists in the several features hereinafter set forth and more particularly defined by claims at the conclusion hereof.

In the drawings: Fig. 1 is a detail view, in perspective, of a gas stove equipped with an oven temperature regulator embodying the invention, parts of the oven being broken away;

Fig. 2 is a detail sectional view taken in a plane defined by the lines 2—2 of Fig. 1, to show the relative position of the parts;

Fig. 3 is a section taken on the line 3—3 of Fig. 2;

Fig. 4 is a detail elevation view of the regulator, parts being broken away and parts being shown in section.

In the drawings the numeral 6 designates a stove, 7 the oven thereof, 8 the gas manifold supplying gas to the usual burners and to the mixing tube 9 of the oven burner which is disposed beneath the oven in the usual manner.

The shut-off valve 10 for the oven burner and the thermostatically-controlled valve 11 of the oven burner are arranged in a casing 12 which has a threaded connection with the end of the gas manifold 8. The shut-off valve 10 is of usual and well-known construction and has a handle 13 for operating it, the valve shown being of the tapered plug type held in position by the usual spring 14, said valve controlling the passage of gas from the manifold through alined passages or ducts 15 and annular space 26 to a chamber 16 in the casing 12. The chamber 16 is connected with a pipe 17 carrying the usual gas nipple 18 that projects into the funnel-shaped inlet of the mixing tube 9 of the oven burner.

The valve 11 is here shown as a ball check valve urged by a spring 19 against a seat 20 having a passage 21 therein. The seat 20 and the valve are mounted on a member or cage 22 which is adjustable vertically in the casing 12. As here shown, this member 22 has a threaded tubular portion 23 and a spindle portion 24. The threaded tubular portion 23 engages with threads in the casing 12 and has the seat 20 in threaded engagement with its lower end. The valve 11 and the spring 19 are mounted within the hollow part of the tubular portion 23, and openings 25 in said tubular portion communicate with the annular channel 26 that communicates with the duct 15 beyond the shut-off valve 10, whereby gas from manifold 8 will flow through ducts 15, space 26, opening 21, chamber 16, pipe 17, nipple 18, and thence to the oven burner when the valves 10 and 11 are open. The spindle 24 of the member 22 projects through a suitable stuffing-box 27 and carries a thumb-knob or handle wheel 28 on its exterior end, said wheel being of usual construction, with gradations or indices thereon cooperating with a fixed pointer 29 whereby the operator may readily set the member 22 in the desired position. It will be noted that the valve 11, spring 19 and member 22 with its seat 20 constitute a complete valve structure which is bodily adjustable toward or away from its operating means.

The casing 12 is preferably designed with a flanged portion 30 that fits up against the front side of the oven so as to cover the hole 30' made in the oven through which the thermostatic element is inserted. The front end of the casing is provided with a threaded opening 31 in which the lower threaded end of one part 32 of the thermostat is mounted. This part 32 is usually a metal tube, such as copper, which expands under increased temperature. The upper end of the tube is closed by a threaded plug 33, thereby forming a tubular extension to the casing 16, and within this casing a relatively inexpansible rod 34, as carbon, for instance, is mounted and projects down below the open end of the tube 32 into engagement with a notch in one arm 35 of a lever 36 pivoted intermediate its ends at 37 within the chamber 16, this lever having an upwardly-extending projection 38 on the arm 36 which works through the opening 21 to move the valve 11 to an open position, but the extent of the movement of this valve is determined by the adjustment of the position of the valve 11 relative to the lever 36, and the position of the valve 11 depends upon the adjustment of the entire valve mechanism, since the valve 11 and its seat are carried by a member 22, it being noted that the seat 20 may be formed as a part of the tubular portion 23 in case the spindle 24 is formed separate from said portion. Thus, the valve-operating means or lever 36 may, at times, contact with and move the valve off its seat and at other times be entirely free of the valve. The lever 36 is held in operative engagement with the rod 34 by a spring 39 interposed between the arm 35 and a removable plug 40. The valve structure is preferably put into place through an opening 41 which is then closed off by a pipe plug 42.

The thermostatic element is disposed within the oven behind the grid 43 at one side and extends upwardly from its mounting on the casing 12 toward the rear of the oven.

The usual pilot burner is also provided, receiving gas from a supply pipe 44 which communicates with the duct 15 through a restricted opening adjusted by the usual adjusting screw 45.

Where the oven regulator is not built into the stove when furnished, the casing 15 may be connected with the manifold 8 by a suitable union coupling to obviate turning the manifold relative to the casing 12 when making the connection, and such a connection is shown herein.

With the construction above described, different adjustments of the valve structure relative to its thermostatically-controlled operating lever 36 will cause more or less gas to be supplied to the oven burner and thus regulate the temperature of the contents of the oven, and the dial 28 enables the operator to set the valve structure to obtain the desired temperature.

By the arrangement of the thermostat and the casing, as described, the usual piping and casings for operating parts that run up on the outside of the oven are eliminated so that the neat and trim appearance of the stove itself is not detracted from.

I desire it to be understood that this invention is not to be limited to any specific form or arrangement of parts except in so far as such limitations are specified in the claims.

What I claim as my invention is:

1. An oven heat control mechanism comprising a thermostat within the oven, a casing connecting the oven burner with a source of gas supply, a spring closed valve adjustably positioned in said casing for controlling the flow of gas to the oven burner, said valve being offset from the axis of the thermostat, and a single lever fulcrumed about a fixed axis within the casing and having an arm directly cooperable with the thermostat and also having an angular extension directly engageable with the valve whereby the valve is controlled from the thermostat.

2. An oven heat control mechanism comprising a thermostat within the oven, a casing connecting the oven burner with a source of gas supply, a spring closed ball valve adjustably positioned in said casing, a single lever fulcrumed within the casing at a point intermediate its ends for rocking movement about a fixed axis, one end of said lever being directly cooperable with the thermostat, the other end of the lever having an angular extension directly engageable with the ball valve for opening the same under the control of the thermostat and spring means for biasing the lever to a position wherein it is disengaged from the valve.

3. An oven heat control mechanism comprising a thermostat within the oven, a casing connecting the oven burner with the source of gas supply, a valve cage having threaded connection with a part of said casing and having gas passages therein, and a spindle extending outside of the casing, a handle wheel on the exposed end of said spindle, a spring-closed valve within said cage for controlling the passage of gas through one of said passages and thus controlling the supply of gas to the burner, means exterior of the casing for turning said valve cage to the desired position, and valve-operating means within said casing operatively connected to said thermostat and engageable with said valve.

4. An oven heat control mechanism comprising a casing connecting the oven burner with a source of gas supply, a valve cage having a tubular portion in threaded connection with said casing and having a gas passage, said tubular portion having a threaded bore, a valve seat member mounted in said threaded bore, a valve in said bore cooperating with said seat to control the supply of gas to the burner, a spring interposed between said valve and the upper end of said bore, said cage also having a spindle portion extending outside the casing, a stuffing box for said spindle, an operating handle on the exposed end of the spindle, a thermostat associated with said casing and extending into the oven, and valve-operating means within the casing operatively connected to said thermostat and engageable with said valve.

In testimony whereof I affix my signature.

ROY W. JOHNSON.